United States Patent [19]

Randall, Jr. et al.

[11] Patent Number: 4,734,061
[45] Date of Patent: Mar. 29, 1988

[54] TELECOMMUNICATIONS TERMINAL BLOCK

[75] Inventors: Herbert E. Randall, Jr., Long Pond, Pa.; Richard J. Schmieder, Sr., Warren, N.J.

[73] Assignee: Bell Communications Research, Inc., Livingston, N.J.

[21] Appl. No.: 948,148

[22] Filed: Dec. 31, 1986

[51] Int. Cl.⁴ .............................................. H01R 9/24
[52] U.S. Cl. ................................. 439/709; 439/801; 439/271; 439/276
[58] Field of Search ........... 339/198 R, 198 E, 198 K, 339/198 S, 198 P, 18 R, 18 C, 18 B, 18 P, 94 M, 263 R, 272 A

[56] References Cited

U.S. PATENT DOCUMENTS

| | | |
|---|---|---|
| 619,263 | 2/1899 | Bachmann et al. |
| 1,005,199 | 10/1911 | Gugler . |
| 1,570,722 | 1/1926 | Baldwin . |
| 1,633,176 | 6/1927 | Goeller . |
| 1,635,351 | 7/1927 | Spurgeon . |
| 1,791,470 | 2/1931 | Runkle . |
| 1,951,591 | 3/1934 | Anzalone et al. ............... 173/259 |
| 1,980,893 | 11/1934 | Walde .............................. 173/259 |
| 2,551,895 | 5/1951 | Noir ................................. 173/259 |
| 2,613,287 | 10/1952 | Geiger ............................. 339/18 C |
| 2,911,615 | 11/1959 | Popejoy et al. ................. 339/18 E |
| 3,223,959 | 12/1965 | Abbott ............................. 339/94 M |
| 3,351,885 | 11/1967 | Baldwin et al. ................. 339/74 |
| 3,602,871 | 8/1971 | Newman .......................... 339/22 |
| 3,775,730 | 11/1973 | Rowls et al. .................... 339/116 R |
| 3,784,964 | 1/1974 | Newman et al. ................ 439/738 |
| 3,860,314 | 1/1975 | Vandiver et al. ............... 339/198 R |
| 3,864,003 | 2/1975 | Boke ................................ 339/198 R |
| 3,930,706 | 1/1976 | Obuch et al. ................... 439/249 |
| 4,123,132 | 10/1978 | Hardy et al. .................... 339/263 R |
| 4,145,107 | 3/1979 | De Haitre ....................... 439/801 |
| 4,340,268 | 7/1982 | Scalera ............................ 439/43 |
| 4,483,910 | 11/1984 | Julian .............................. 439/504 |

FOREIGN PATENT DOCUMENTS

| | | |
|---|---|---|
| 15469 | 9/1929 | Australia . |
| 711240 | 9/1931 | France . |
| 844804 | 8/1939 | France . |
| 0251655 | 12/1929 | Italy ................................ 339/198 E |

Primary Examiner—Gil Weidenfeld
Assistant Examiner—Thomas M. Kline
Attorney, Agent, or Firm—James W. Falk; Lionel N. White

[57] ABSTRACT

A telecommunications terminal block provides service wire terminations within cells that are electrically and physically isolated from other cells in the block, and from the environment, thereby effectively preventing corrosion and shorting by eliminating electrical bridging between tip and ring service wire circuits. Cell 21 in the dielectric terminal block body 10 contains a pair of spaced-apart contact surface members 32, 35 that are forced into compression engagement upon an inserted service wire end 26 by threaded advancement of a dielectric plug 13 situated within the cell. A conduit bore 12 in the block wall directs insertion of the stripped service wire 16 between the contact members prior to plug advancement, and a gasket member 38 extending across the annular space between the plug and the cell wall, with an optional cell-filling gel 47, ensures exclusion of the environment from the cell and isolation between tip and ring circuits.

13 Claims, 5 Drawing Figures

TELECOMMUNICATIONS TERMINAL BLOCK

BACKGROUND OF THE INVENTION

In telecommunication networks, particularly in the telephone loop network, connection between the loop and the drop or service line to a customer's premises is commonly effected at a terminal block located in an aerial, or with the more recent practice of utilizing underground cable, a pedestal terminal. The terminal block which has long been employed in this role comprises simply one or more pairs of threaded metal posts embedded in an insulating body of dielectric material and carrying spacing metal washers and a tightening nut. Each one of a pair of such posts is permanently affixed to a respective tip and ring wire comprising a wire pair of the local loop cable, and connection of a customer service line pair is accomplished by wrapping each of those service wires about its appropriate post between the washers and tightening down the nut.

While the enclosure of the terminal structure, a pedestal for example, shields the terminal block and its connections from vandalism and the intrusion of larger animals, it provides little practical protection from smaller animals and insects, or from the greater danger of moisture and environmental exposure. Telephone line performance can thus suffer from the occasional shorting resulting from the bridging of terminal posts by resident animals, the webs of spiders, and the like. More regularly, however, the bridging is brought about, and the terminations themselves damaged, by corrosion of the exposed metal parts of the terminal block.

Such corrosion is induced and promoted by the constant moisture of the environment, whether it be from condensation, precipitation, or flood, coupled with the continuous electrical potential that is maintained between the tip and ring wires of a working pair, and consequently between the corresponding terminal block posts. As corrosion of these parts continues, the corrosion products accumulate and spread over the surface of the block body until the space between posts is physically bridged to form a high resistance short across the circuit.

Previous attempts at preventing this damaging corrosion have included the reshaping of the terminal block body to form extended pedestals to support the terminal posts, thus increasing the block surface distance between posts. This approach served to prolong the interval until bridging occurred, but did little to deter the inevitable corrosion. Protective caps or boots filled with waterproof dielectric grease or gel and fitted individually over each terminal post subsequently showed some promise as a protective, corrosion-inhibiting means; however, the temporary, removable nature of these devices significantly reduced their continuing value. The failure of these and other attempts, prior to the present invention, to eliminate the corrosion at terminal block posts had left the industry constantly subject to the extensive losses and expenditures resulting from this phenomenon.

SUMMARY OF THE INVENTION

The terminal block of the instant invention effectively prevents the corrosion of, and the subsequent shorting between, service wire pair terminations by electrically and physically isolating such terminations from each other, from other terminations in the block, and from the environment.

To this end, a block body of dielectric material is provided with a plurality of bores that form cells at which the respective ends of the usual stub cable wires are permanently affixed in contact with connector members that extend to the interior of the cells. A service wire directed into a cell through the narrow conduit bore that communicates from the exterior of the block is compressed into terminating electrical contact with the cell connector member by threaded insertion of an insulated plug member that seals the cell and isolates the termination from the environment.

In an embodiment of the invention the cell connector comprises a threadedly tapped metal contact plate member embedded in the block body at the bottom of the cell bore. A matching connector member comprises a threaded stud that is embedded in the lower end of a cylindrical plug of dielectric material. A captive metal washer on the stud shank protects the plug end and facilitates the rotation of the plug during later compression contact with a service wire. A circumferential O-ring gasket on the body of the plug fills the annular space between the plug and the cell wall as the stud is threaded into the tapped plate member and seals the area of the connector in the bottom portion of the cell from moisture and other matter which may accumulate about the mouth of the cell at the upper surface of the block body. The individual wires of the stub cable are made fast to respective wire wrap studs extending from the lower ends of the cell bottom plate members, and these terminations are sealed within the block during manufacture by means of an insulating potting compound.

Completion of a circuit between a desired cable wire and a selected service wire is effected in the field by unscrewing the appropriate plug and its stud in order to open a closure space between the cell bottom plate and the stud washer sufficiently to allow insertion of the bared end of a service wire as it is directed into the cell via a conduit bore in the block wall. With the wire thus positioned, the plug is firmly screwed back into the cell until the stud washer is bottomed tightly upon the wire end, thereby completing the contact between the service and stub cable wires.

While the cell plug gasket provides the major seal preventing the environment, particularly moisture, from reaching the service wire termination, the insulation of the wire itself affords a substantial seal against seepage through the conduit bore. In order to entirely ensure against capillary intrusion of moisture through these bores, particularly those which are not in actual use, or which normally serve only for intermittent test access, the cells of the block may be loaded during manufacture with a dielectric gel which will be forced into all conduit bores during initial assembly of the plugs into the block. This gel is readily displaced upon insertion of a service wire, and does not interfere with the electrical contact between the wire end and the surface of the cell connector member.

THE DRAWING

The present invention may be readily seen in the accompanying drawing of which:

DESCRIPTION OF THE INVENTION

Figure 1:
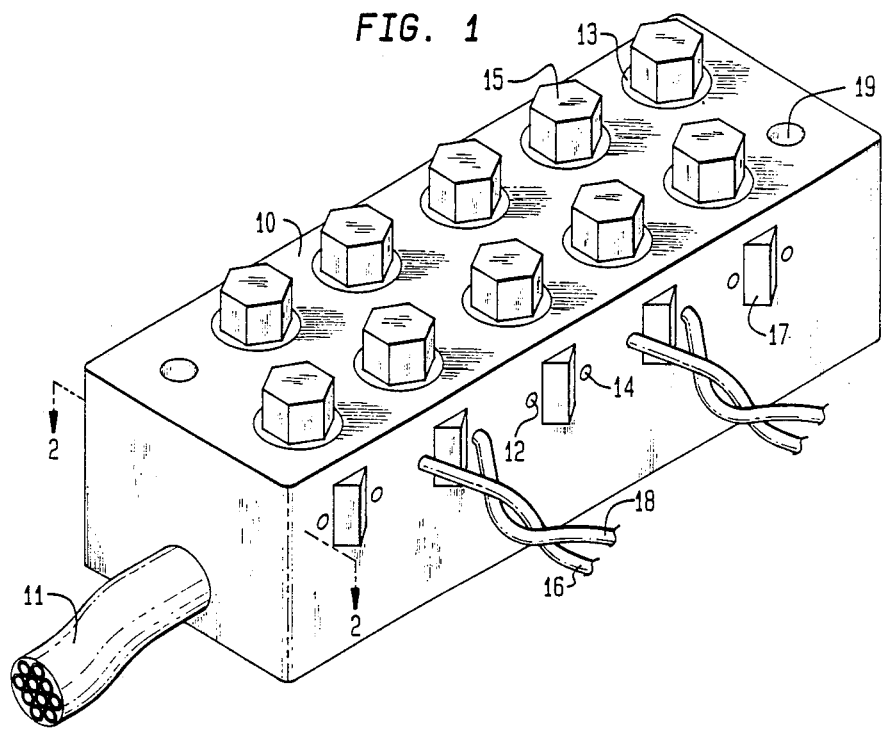
FIG. 1 is an isometric view of an assembled terminal block in partial use.
Figure 2:
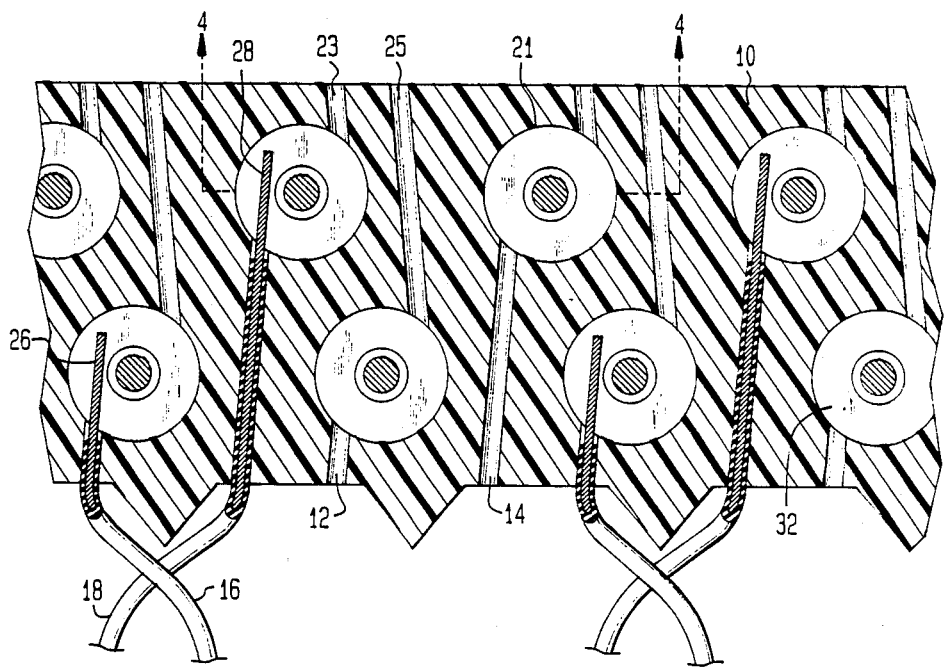
FIG. 2 is the plan view, taken in section at 2—2 in FIG. 1, of a segment of the block.
Figure 3:
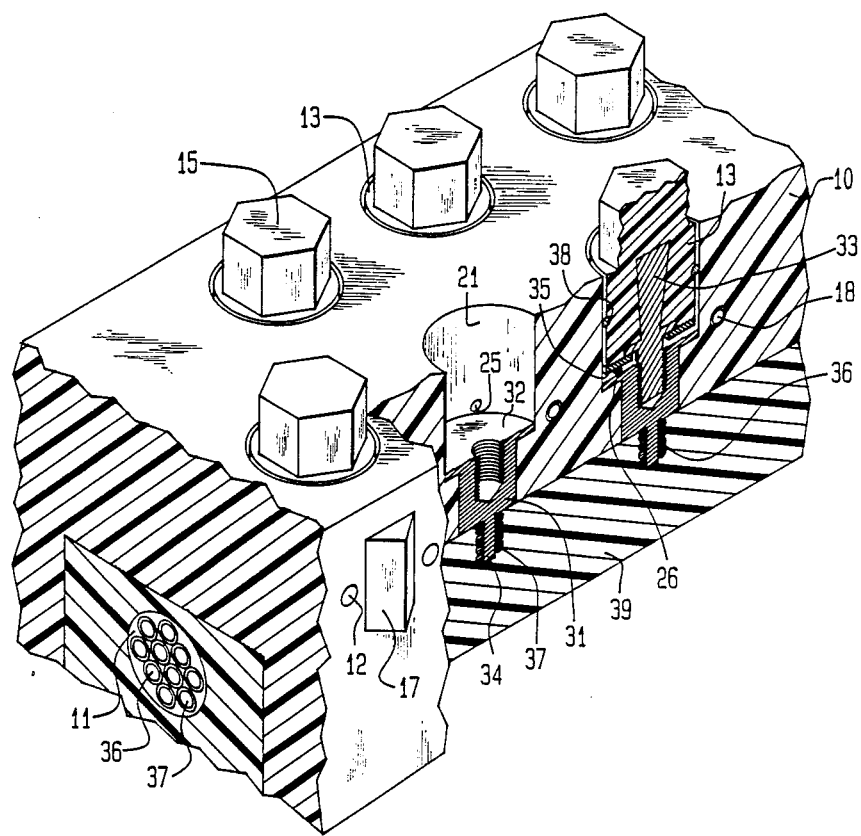
FIG. 3 is an isometric view, in partial elevational section, of a segment of an embodiment of the terminal block.

The terminal block of the invention generally comprises a body member 10 molded of a common dielectric, heat- and solvent-resistant structural material, such as a phenolic or ABS/PVC resin, having a series of open cells 21 (FIG. 3) arranged in lateral pairs along its length at the upper surface. A series of conduit bores 12, 14, 23, 25 provide access to the interior of the cells from the sides of the block body. These bores, which may be drilled or molded into the body, e.g. at a mold part plane along section line 2—2, are sized to closely accommodate the insertion of common telephone service wires of about 22 to 28 AWG, thus providing for a fairly effective seal which prevents the entrance of moisture through these openings into a cell from the exterior of the block. As a further measure to deter seepage at these bores, they may be angled slightly toward the lower end of the block, i.e. usually that from which the stub cable 11 extends.

During the process of molding body 10, female threaded metal insert members 31 are located at the bottoms of cells 21 to provide lower terminal contact surfaces 32. Extending downward from inserts 31 into an access space within the lower portion of body 10 are studs 34 about which each respective stub cable wire, such as 36, 37, is permanently terminated in a wrapped or soldered connection. Upon the completion of such connections, the access space is filled with a dielectric potting compound 39 to seal the stub cable wires and their terminations from the environment.

The second member of the termination connector couple is plug 13 which is molded of dielectric material, such as that of which block body 10 is composed. Molded within plug 13 in this embodiment is threaded stud insert 33 which although not necessarily electrically conductive may be of the same metal composition as insert 31. A captive washer 35, which likewise may be of metal, is threaded onto stud 33 to yield a firm seat complement to surface 32 protecting the lower end of plug 13 and providing a rotation bearing during engagement of a service wire in the block. A circumferential groove about the body of plug 13 provides a seat for O-ring seal 38 which contacts the wall of cell 21 when the plug is inserted into the cell, thereby preventing moisture and other environmental hazards at the mouth of the cell from entering into the lower portion where the service wire termination will be located.

Assembly of the terminal block at the point of manufacture entails the simple insertion of plug 13 into cell 21 until the threaded parts of insert 32 and stud 33 engage, followed by threaded advancement of the plug at least until seal 38 is positioned within the cell. Insertion of plug 13 may be aided by chamfer 48 at the mouth of the cell, and as further ensurance against the later intrusion of moisture into the cell, a measure of a semisolid waterproof composition, such as a grease or a low viscosity silicone gel, e.g. commercially-available SYLGARD 527, may be deposited at the cell bottom prior to insertion of plug 13. The gel composition used in this manner substantially fills the lower portion of the cell, as at 57 in FIG. 5, upon threaded positioning of plug 13, with some of the gel being forced into bores 12, 14, 23, 25 to thereby seal all cell openings until actual use in the field.

Thus assembled, the terminal block is ready to be mounted, as by means of bores 19 or threaded inserts (not shown) embedded in the block body, within a pedestal closure where the various wires of stub cable 11 are permanently connected to the respective individual wires of the loop. Termination of service wire pairs, such as 16, 18, may thereafter be effected as needed simply by unscrewing a pair set of plugs 13 at least sufficiently to provide a closure space of wire end diameter between washers 35 and cell floor inserts 31 and their contact studs 34.

Insertion of service wires into proper cell pair sets is aided by the inclusion of guide extensions 17 in the mold of body 10. These extensions serve to separate and direct each of the wire pair to its intended cell. Each cell is also provided with a test wire access bore, as at 23, 25, which normally is sufficiently narrow to prevent moisture intrusion, but with an injected filling of gel is completely sealed to any such conductive matter. As with the service wires, the test wires may readily be inserted through any mass of the low viscosity gel which will flow sufficiently to restore the seal upon withdrawal of the test wire. A wire measuring gauge, not shown, may also be included in the body mold to aid in the rapid determination of the proper insertion and stripping lengths to be employed for the respective service wires. As an added convenience, the extending heads 15 of the cell plugs are sized to accommodate the socket tool commonly in present use throughout the field.

With the service wire pair thus in place within the terminal block there is virtually no physical or electrical path available between the terminated ends 26, 28 of the wire pair, or between any surface-accessible components of the termination couple, to enable the initiation or promotion of electrolytic corrosion at these terminations. As is clearly apparent, all exposed surfaces of the block assembly are of dielectric composition, and access to the terminating connectors within the body cells is effectively prevented by the circumferential cell seal and by the insulating sheathing of the inserted wires, aided by the presence, if desired, of dielectric gel within the various remaining conduits.

Figure 4:
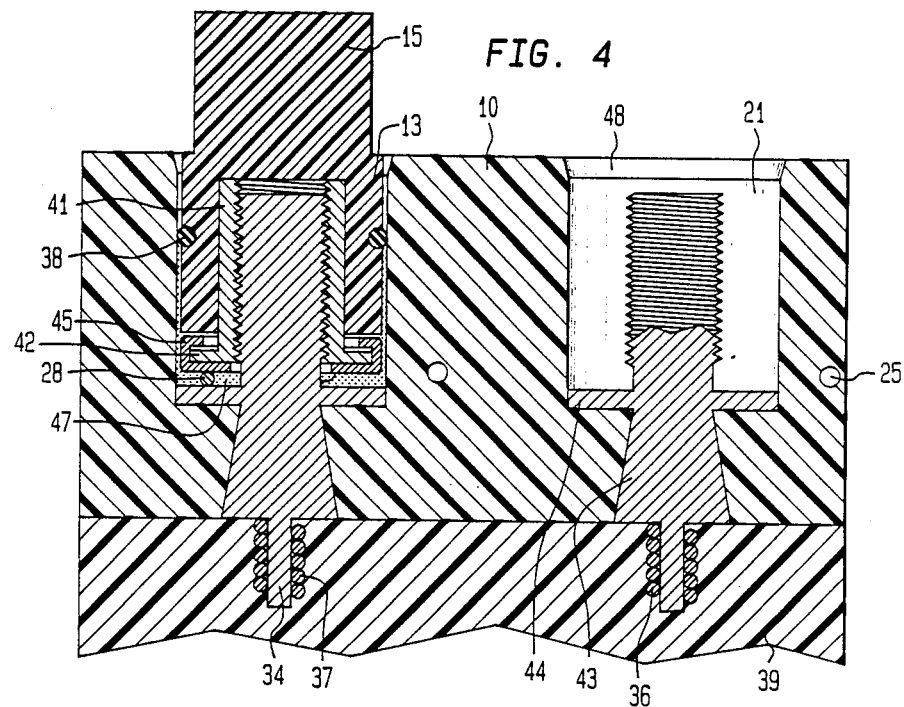
FIG. 4 is an elevational view, taken in section at 4—4 in FIG. 2, of a segment of another embodiment of the block.

In another embodiment of the present invention, as seen in FIG. 4, the threaded stud member 43 is molded into body 10 at the bottom of cell 21 where flange 44 forms the cell floor. Depending contact stud 34 provides a terminus for stub cable wires 36, 37 as previously described. Matching female threaded insert member 41 is molded into the body of cell plug 13 and presents a shoulder flange 42 about which washer 45 may be folded to provide a floating, captive compression surface element which complements cell floor contact 44 in the firm engagement of wire end 28.

Figure 5:
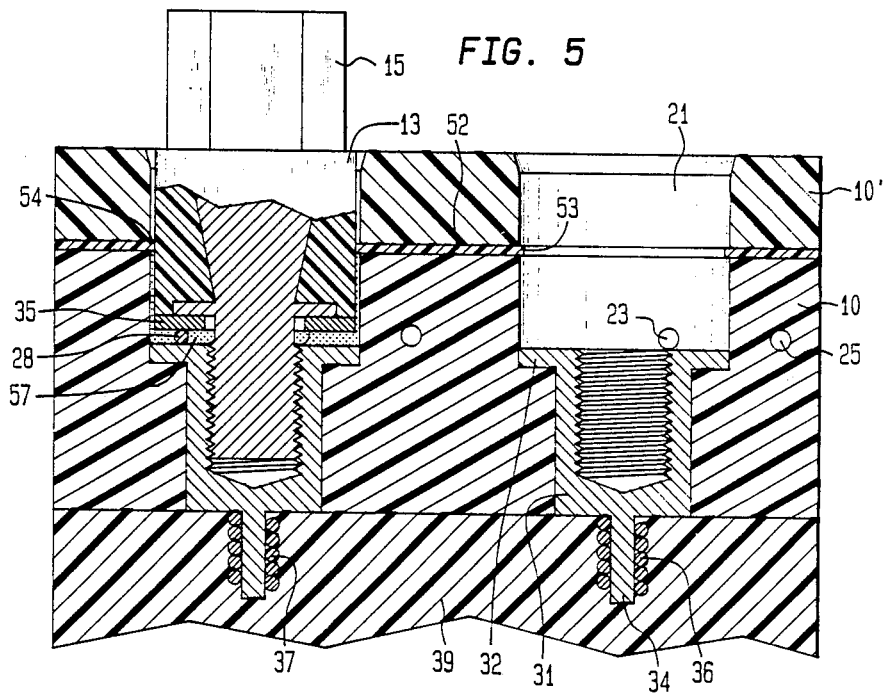
FIG. 5 is an elevational view, taken in partial section at 4—4 in FIG. 2, of a segment of yet another embodiment of the terminal block of the present invention.

Yet another embodiment of the invention, shown in FIG. 5, provides a different type of cell seal which is integral with the block body and eliminates the need for a separate sealing element on the plug member. This seal is essentially a thin flexible sheet 52 of a dielectric material, such as a polyolefin or a polytetrafluoroethylene composition, firmly held by adhesion or mechanical clamping means, not shown, between lower and upper sections 10, 10' of the block body and oriented to extend transversely of cells 21. At each cell, sheet 52 is through-cut to form an opening concentric with the cell and of a diameter somewhat smaller than the diameter of plug 13, thus providing a circumferential lip 53 within each cell. Upon insertion of a plug 13, lip 53 is displaced in the direction of insertion, as at 54, to closely engage the surface of the plug and seal the lower interior of the cell from the environment.

Other embodiments of the invention will be apparent from the foregoing description to those of ordinary skill in the art, and such embodiments are likewise to be considered within the scope of the invention as set out in the appended claims.

What is claimed is:

1. A terminal block comprising:
   (a) a body of dielectric material having a plurality of open cells in the upper surface thereof, each of said cells having firmly embedded therein to form the cell floor an electrically conductive insert comprisng one member of a threaded couple;
   (b) a plurality of plugs of dielectric material each closely accommodated in a respective one of said cells, thereby forming a narrow annular space between the respective walls of each said plug and cell, each of said plugs having firmly embedded therein at its lower end the other member of said threaded couple, said couple members being in interactive engagement whereby the lower end of said plug may be displaced toward compression contact with said cell floor;
   (c) sealing means contacting each respective plug completely about the circumference thereof and extending outwardly across said annular space, thereby preventing access to the floor of said cell from said body upper surface;
   (d) a plurality of bores in said body communicating between the exterior of said body and the interior of each respective cell closely adjacent its floor; and
   (e) a stub cable comprising a plurality of electrical conductors extending from the exterior of said body to the interior thereof where each respective conductor of said cable terminates in a conductive connection with a separate one of said cell inserts, thereby establishing an electrical circuit between each of the exterior ends of said conductors and the respective cell floors.

2. A terminal blcok comprising:
   (a) a body member of dielectric composition;
   (b) a plurality of bores in the upper surface of said body member and terminating therein to form a like plurality of cells within said body member;
   (c) a plurality of plug members each situated within a respective one of said cells and dimensioned to be individually closely accommodated within said cell, thereby forming a narrow annular space between the respective walls of each said plug and cell;
   (d) a plurality of cell insert members of electrically conductive composition firmly affixed to said body member and respectively situated within each of said cells to form a floor surface therein, said insert members each comprising one of a pair of interactive threaded elements;
   (e) a plurality of plug insert members each firmly affixed to a respective one of said plug members and presenting at the lower end thereof the other of said threaded element pair, whereby insertion of a plug member into its respective cell establishes contact between said threaded element pair, and interactive engagement of said pair will cause said plug member lower end to be moved toward the floor surface of said cell, thereby forming a closure space at the bottom of said cell between said plug member lower end said floor surface;
   (f) sealing means contacting each respective plug completely about the circumference thereof and extending outwardly across the annular space of the cell within which said plug is accommodated, thereby forming a seal preventing access to said closure space from said body member upper surface;
   (g) a plurality of bores in said body member communicating respectively between each said closure space and the exterior of said block, said bores being sized to closely accommodate a wire intended to be terminated at said block; and
   (h) a stub cable extending to the exterior of said body member and comprising a plurality of wires each of which is terminated at its body interior end in an electrically conductive connection with a different respective one of said cell insert members, thereby establishing a conductive circuit between the exterior end of each stub cable wire and the respective ones of said cell floor surfaces.

3. A terminal block according to claim 2 wherein said cell insert member comprises an internally threaded bore, and said plug insert member comprises a matching threaded stud.

4. A terminal block according to claim 2 wherein said cell insert member comprises a threaded stud, and said plug insert member comprises a matching threaded bore.

5. A terminal block according to claim 2 wherein said cell and plug insert members are of the same metal composition.

6. A terminal block according to claim 2 which further comprises a washer member situated adjacent to the lower end of each plug member and loosely engaging the respective plug insert member, thereby providing a bearing surface complementary to each said cell floor surface.

7. A terminal block according to claim 2 wherein said closure space contains a dielectric gel composition.

8. A terminal block comprising a body of dielectric composition, a stub cable contained within said body and comprising a plurality of electrical conductors, and a plurality of threaded compression connnectors affixed to said body and in conductive connection with respective ones of said conductors, whereby service wires may be placed in electrical circuit with respective ones of said conductors by means of compression engagement with respective ones of said connectors, characterized in that
   (a) each said connector comprises:
      (1) a first electrically conductive insert member in conductive connection with one of said conductors and embedded within said body at the bottom of a cell bore in said body to thereby form a conductive floor in said cell, said insert member comprising one of an interactive threaded couple; and
      (2) a second insert member comprising the other of said threaded couple embedded in a plug of dielectric composition situated within said cell and sized to be closely accommodated within said cell, thereby forming a narrow annular space between the respective walls of each said plug and cell, the lower end of said plug forming with said cell floor a closure space within which a service wire may be compressed into contact with said floor when said couple are in threaded engagement;
(b) sealing means contacting said plug completely about the circumference thereof is situated above said closure space and extends outwardly across said annular space to thereby prevent access to said closure space from the mouth of said cell; and
(c) a conduit bore sized to closely accommodate a service wire communicates between the exterior of said block and said closure space, threby providing for the insertion of said wire into said closure space prior to compression engagement with the floor of said cell upon threaded advancement of said plug.

9. A terminal block according to claim 8 characterized in that said cell insert member comprises an internally threaded bore, and said plug insert member comprises a matching threaded stud.

10. A terminal block according to claim 8 characterized in that said cell insert member comprises a threaded stud, and said plug insert member comprises a matching threaded bore.

11. A terminal block according to claim 8 characterized in that a washer member is situated adjacent to the lower end of said plug and loosely engages said plug insert member, thereby providing a bearing surface complementary to said cell floor.

12. A terminal block according to claim 8 characterized in that said closure space contains a dielectric gel composition.

13. A terminal block according to claim 8 characterized in that said first and second insert members are of the same composition.

* * * * *